United States Patent [19]
Follrath et al.

[11] 3,739,619
[45] June 19, 1973

[54] AUTOMATIC EXTRUSION HANDLING SYSTEM

[75] Inventors: Richard D. Follrath, Greenville; Russell L. Race, Ada, both of Mich.

[73] Assignee: Clark Automation, Inc., Belding, Mich.

[22] Filed: Dec. 16, 1971

[21] Appl. No.: 208,577

[52] U.S. Cl. .................. 72/255, 72/257, 72/342, 72/392, 72/426
[51] Int. Cl. ................... B21c 23/00, B21d 25/00
[58] Field of Search .................. 72/255, 257, 426

[56] References Cited
UNITED STATES PATENTS
3,267,711  8/1966  Anderson .......................... 72/257

Primary Examiner—Charles W. Lanham
Assistant Examiner—Robert M. Rogers
Attorney—C. Frederick Leydig, Richard L. Voit, Edward W. Osann, Jr., et al.

[57] ABSTRACT

An automatic extrusions handling system which requires a minimum of plant space and labor and wherein extrusions are cooled, cut and stretched on and directly next to the run-out table associated with the extrusion press. Also disclosed is an extrusion loading and unloading apparatus for removing cooled extrusions from the run-out table, transferring them directly to the stretchers and simultaneously removing stretched extrusions from the stretchers with the transfer motions being in a generally rectangular path that prevents joggling of the extrusions out of alignment.

8 Claims, 11 Drawing Figures

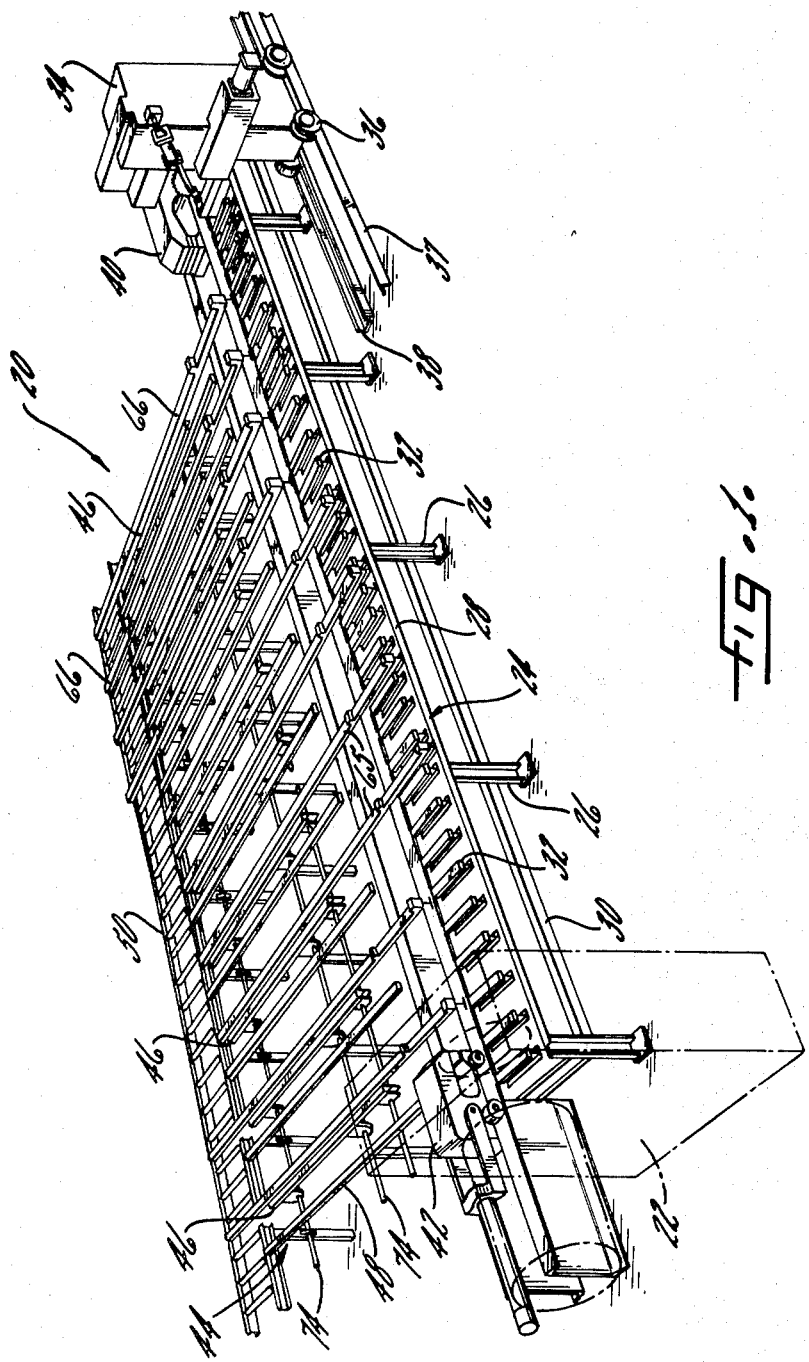

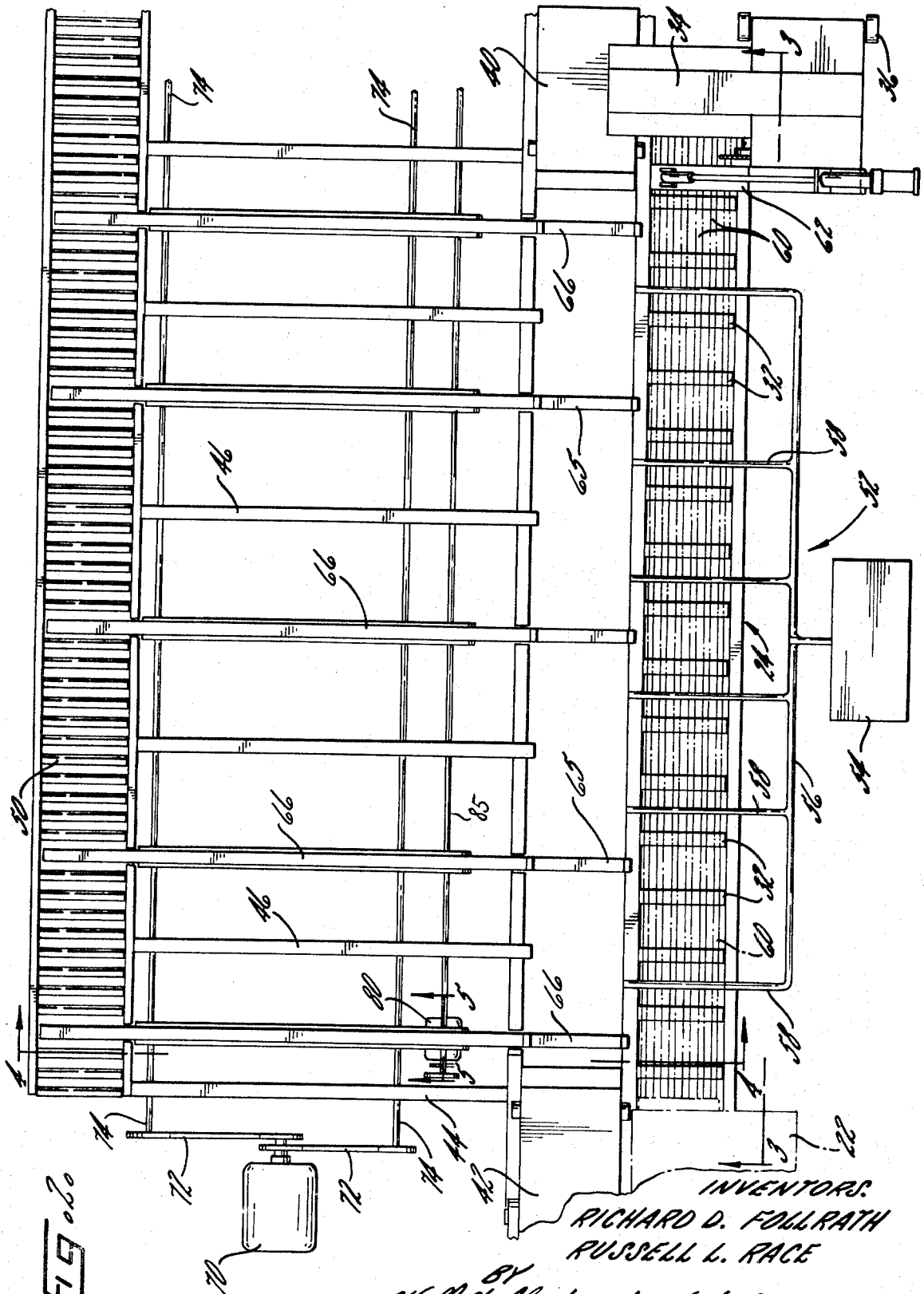

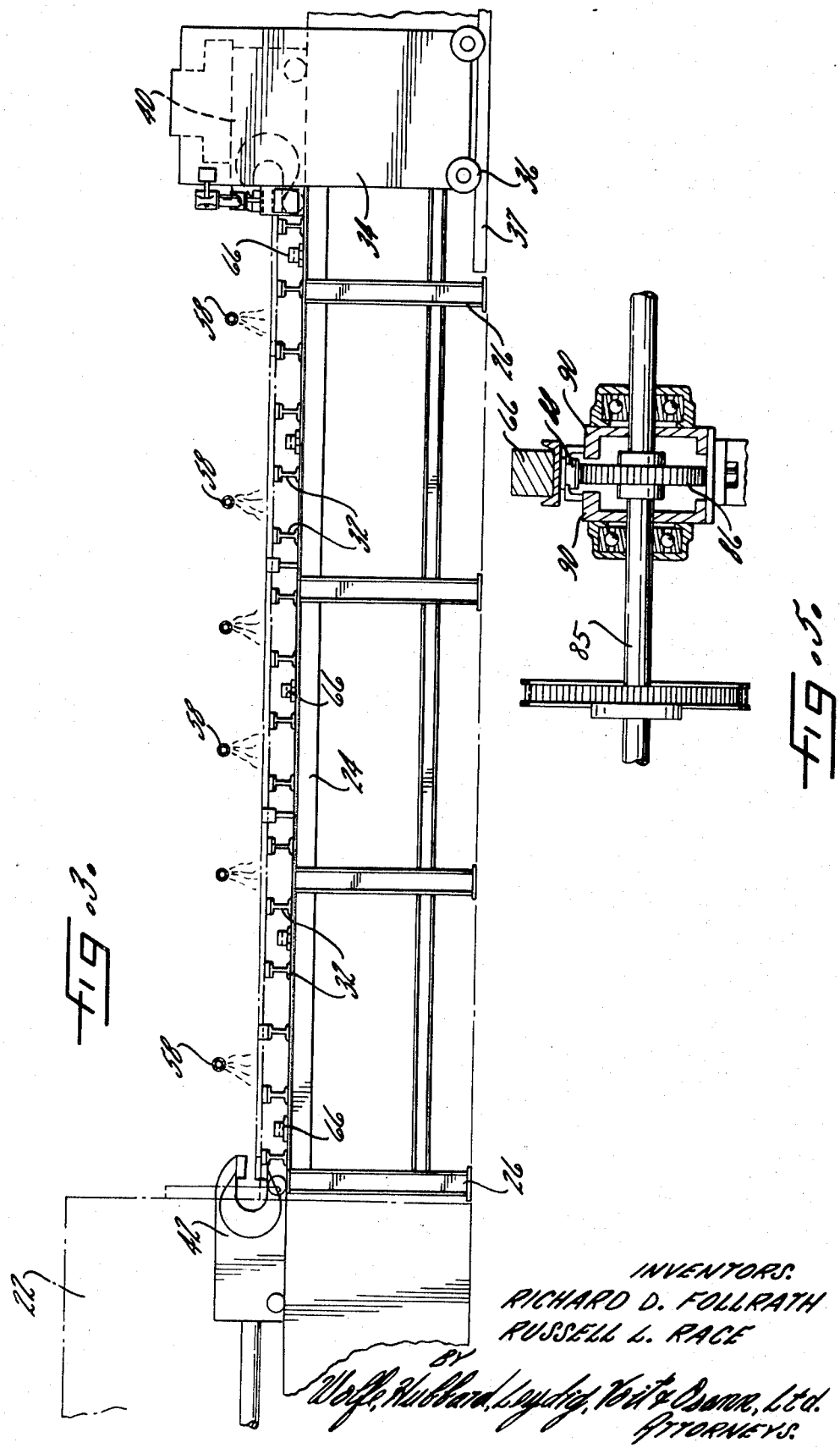

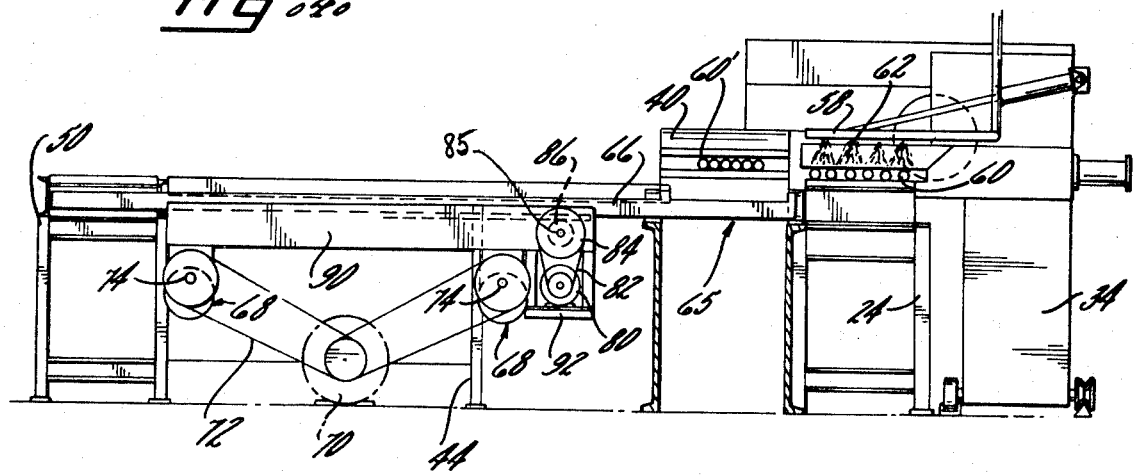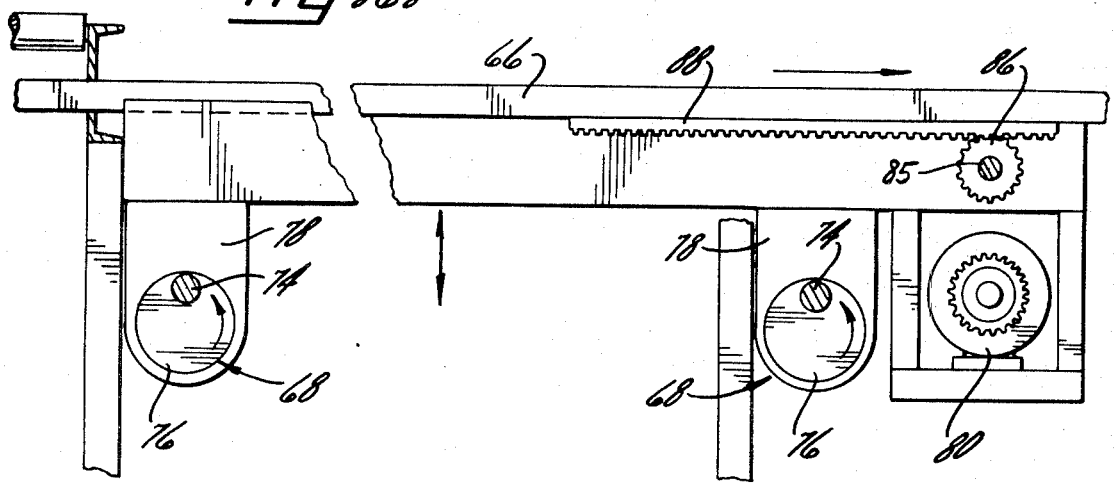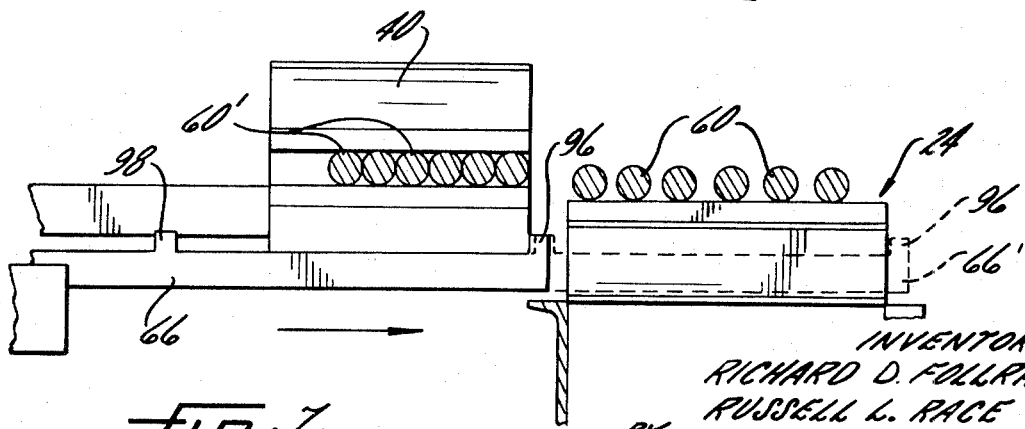

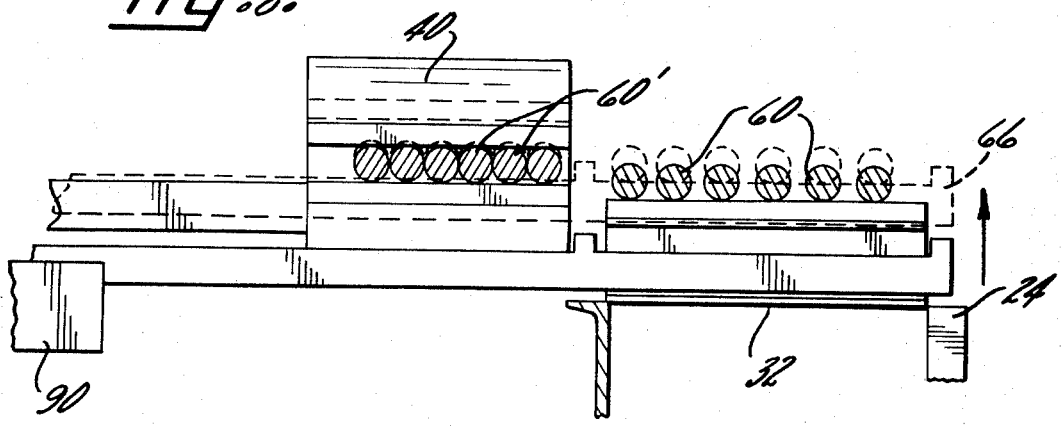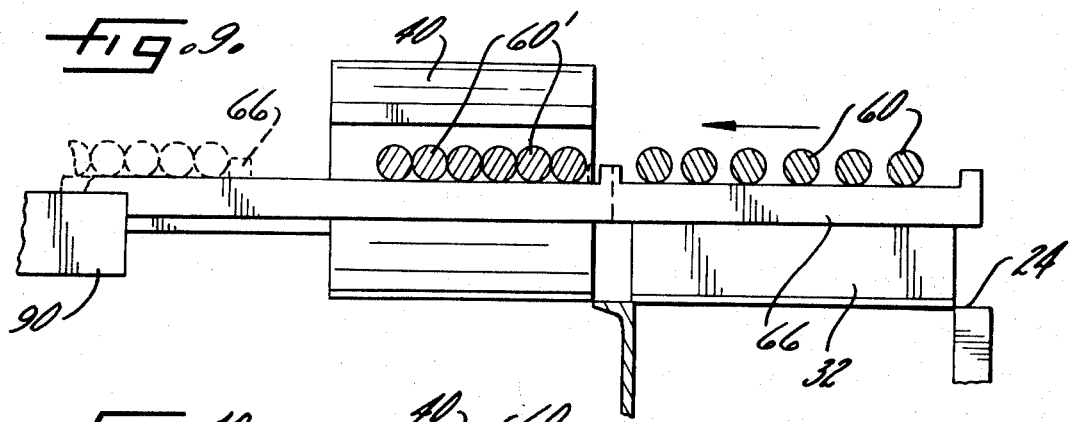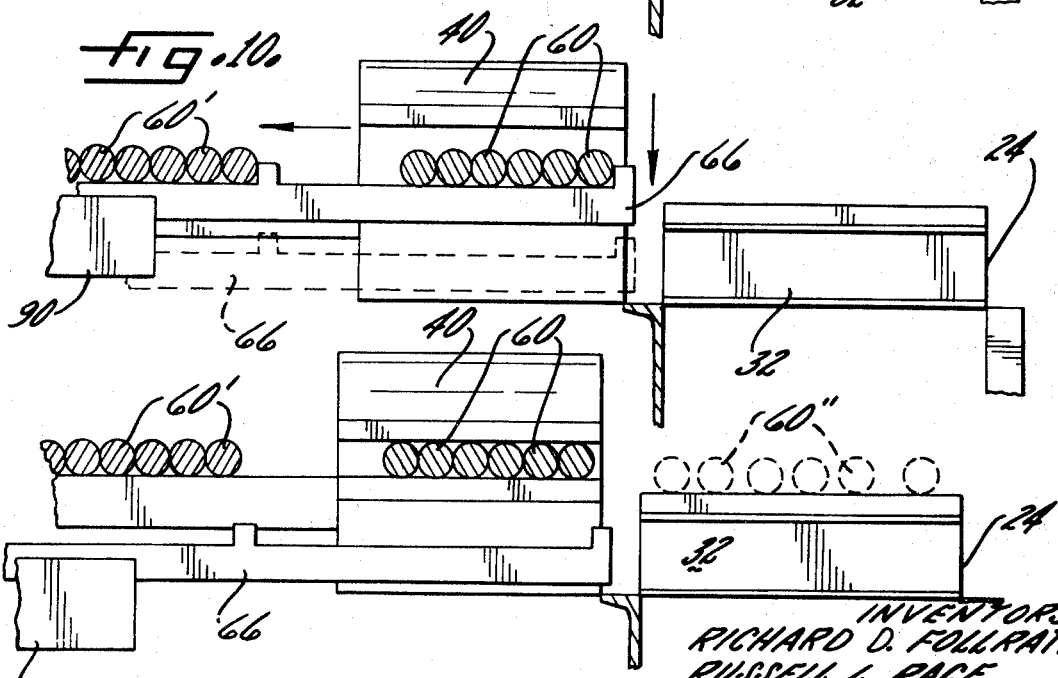

AUTOMATIC EXTRUSION HANDLING SYSTEM

BACKGROUND OF THE INVENTION

The present invention relates generally to extrusion handling systems and more particularly to apparatus and procedures for performing the various manufacturing operations on extruded articles which readily lends itself to fully automated operation, yet wherein a minimum of plant space and labor is required to accommodate the equipment performing the operations of extruding, cooling, stretching and transferring to storage or for shipment. In one of its principal aspects the present invention relates to apparatus for automatically loading extrusions onto the stretchers to work harden and straighten without joggling the extrusions out of alignment. While not so limited in its application, the system of the present invention will find especially advantageous use in the production of aluminum extrusions of fairly long lengths.

Heretofore, in the production of aluminum extrusions and the like it has been the practice to extrude the articles from a press onto a run-out conveyor or table from which the extrusions are transferred to a cooling table. Then the extrusions are conveyed in a transverse direction along the cooling table for an ample distance to permit sufficient cooling of hot extrusions. Upon reaching the end of the cooling table it has been typical for workmen to be present to place the extrusions into stretchers that stretch the extrusions slightly past their yielding point to remove any kinks and bends as well as to work harden them. After stretching, the extrusions were placed on a storage table that conveyed them to a saw location where they were cut to the desired length. Upon completion of the sawing operation, the extrusions are transferred to where they may be shipped or stored.

An arrangement of the foregoing type is shown and described in R.N. Anderson U.S. Pat. No. 3,267,711. However, such arrangements still require a large amount of plant space for performance of the various operations of cooling, stretching, storing and sawing of the extrusions. Moreover, with such arrangements manual loading of the stretching mechanisms and even manual operation thereof is usually required.

Accordingly, it is a general aim of the present invention to provide an improved extrusion handling system which is fairly compact in size and which is particularly suitable for use in fully automatic mass production manufacturing operations.

A related object is to provide an apparatus for automatically loading stretching mechanisms so as to eliminate the need for workmen conventionally required for manual loading and operation thereof.

Another object is to provide an automatic extrusion handling system which eliminates the need for a cooling table whereby the stretching and storing may occur in close proximity to the extrusion press and run-out table.

It is another object of the invention to provide an extrusion handling system which automatically loads extrusions from the run-out table into the stretchers to prevent the extrusions from being joggled out of their normally straight alignment by virtue of other intermediate transference or handling operations.

It is another object of the invention in one of the aspects to provide a stretcher loading apparatus which is capable of removing extrusions from the run-out conveyor and transporting them linearly between the jaws of the stretchers while simultaneously removing stretched extrusions therefrom and then placing the extrusions onto a storage table when returning to pick up further extrusions from the run-out table.

Other objects and advantages of the invention will become apparent upon reading the attached detailed description and upon reference to the drawings.

DESCRIPTION OF DRAWINGS

FIG. 1 is a perspective diagrammatic illustration of an automatic extrusion handling system in accordance with the present invention;

FIG. 2 is an enlarged top view of the system illustrated in FIG. 1;

FIG. 3 is a view taken substantially along the line 3—3 in FIG. 2;

FIG. 4 is a view taken substantially along the line 4—4 in FIG. 2;

FIG. 5 is a view taken along the line 5—5 in FIG. 2;

FIG. 6 is an enlarged side view, partly broken away of the drive for the stretcher loader mechanism of the present invention;

FIG. 7 is a fragmentary side view of a stretcher jaw and run-out conveyor with exemplary extrusions, here illustrating the loader mechanism beginning an exemplary cycle;

FIG. 8 through FIG. 11 are views similar to FIG. 7 here illustrating in sequence the completion of a cycle of operation of the stretcher loader mechanism.

While the invention is susceptible of various modifications and alternative forms, an illustrative embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention.

GENERAL SYSTEM ORGANIZATION

Referring now to the drawings, and particularly to FIG. 1, there is illustrated an exemplary extrusion handling system, generally indicated at 20, which is particularly suited for mass production manufacturing of elongated aluminum extrusions and the like.

The exemplary extrusion system 20 includes a extrusion press 22 (shown in phantom) that is preferably of the multiple die opening type which will produce a plurality of extrusions upon one stroke of the press acting on a single billet. As the extruded material emerges from the die openings it is received upon the run-out table 24 which extends longitudinally with respect to the axis of the forming dies of the press.

Referring to FIGS. 1 and 3 conjointly, the run-out table 24 is formed of plurality of spaced vertical columns 26 that are anchored to the floor and are interconnected by top braces 28 and intermediate braces 30. The table top surface upon which the extrusions ride is composed of a plurality of cross members 32 spaced apart along the top braces 28.

Positioned along side the run-out table 24, adjacent the end opposite the extrusion press, in a saw 34 mounted upon wheels 36 which ride along tracks 37,38. Since the extrusions tend to be of different lengths when they are formed through the multiple die openings, the saw is programmed to operate after completion of the extrusions to cut-off the uneven ends.

Positioned immediately adjacent the run-out table on the opposite side thereof and at opposite ends are stretchers 40,42 which receive the extrusions directly from the run-out table to stretch and straighten them by removing twists and warpages that occur during the extrusion operation. Moreover, the stretching work hardens the extrusions during the elongation that occurs.

From the stretchers, the extrusions are transferred to a storage table 44 which consists of a walking beam type structure that is well known in the art. Briefly, the arrangement employs what is commonly referred to as an interdigitated system in which elongated walking beam members 46 are interleaved between stationary numbers 48 that define the top surface of the storage table. The walking beam members move through a closed curved path between the stationary members so that part of the path of the walking beam motion occurs above the stationary support beams of the table and the other portion of the motion is executed below the stationary beams. Thus, in a step-wise fashion, the walking beams lift elongated articles at a first position transversely along the stationary beams, advance the articles forward as the walking beams descend and place the article in a second advanced position along the stationary beams when the path of the walking beams takes them below the surface of the stationary beams. The "walking" of the article is executed in a continuous step-wise cycle proceeding from one end of table to the other as the walking beams go through their continuous closed path cycles.

At the opposite end of the walking beam storage table 44 there is positioned a transfer conveyor 50 which serves to move the completed extrusions in a longitudinal direction to the appropriate storage, packing or shipping area.

COOLING APPARATUS

In accordance with the present invention, provision is made for eliminating the need for a separate rather long cooling table adjacent the run-out table and the operations of cooling, cutting and stretching are automatically performed in a relatively compact space immediately on and adjacent to the run-out table. Thus, referring to FIG. 2 there is provided cooling apparatus, indicated generally at 52 in FIG. 2, positioned along the run-out table 24 which serves to quickly reduce the temperature of the extrusions that emerge from the press die in an extremely hot physical state due to the work performed in the extrusion process.

The temperature of the extrusions exiting from the dies is normally sufficiently high that they are not in a rigid state and have a very pronounced tendency to warp, twist or bend especially if handled or transferred during this heated state. The positioning of the cooling apparatus along the run-out table eliminates the need for the conventional cooling table that not only occupies a great deal of plant space but involves handling of the extrusions while still in their heated state which contributes to further warping or bending of the extrusions as they are transferred along the cooling table.

Here, in the exemplary cooling apparatus illustrated in FIG. 2 there is provided a source of liquid coolant 54 which supplies the coolant under pressure through a longitudinally extending conduit 56 parallel to the run-out table to a plurality of conduit branches 58 that extend transversely across the run-out table. These branches 58 may be provided with suitable openings or nozzles to direct a spray or mist of coolant completely over the extrusions 60 which have emerged from the press 22 onto the run-out table 24. It will be understood by those skilled in the art that the particular manner in which the cooling is accomplished is not critical to the present invention and arrangements may be made for quickly quenching the extrusions with inert substances such as air, water or other fluid coolants as they are positioned on the run-out table.

CUTTING OPERATION

In keeping with the compact feature of the present extrusion handling system, the saw 34 as previously indicated is positioned along the run-out table 24 adjacent the end opposite that of the extrusion press so that the transversely reciprocable saw head 62 can cut off the uneven ends of the extrusions directly after they emerge onto the run-out table and are cooled sufficiently by the cooling apparatus 52. The saw may be fully automatic in operation so that it positions itself along the tracks and performs the cutting operation under programmed control triggered by suitable sensing devices placed in connection with the run-out table.

STRETCHING OPERATION

Following the cooling and cutting-off of the uneven ends of the extrusions, provision is made to directly transfer the extrusions into the jaws of the stretchers 40,42 where the extrusions are stretched to remove any bends or warpages as well as to work harden the extrusions through their elongation. To this end, provision is made for lifting the extrusions straight up from the run-out table and moving them linearly between the jaws of the stretchers 40,42 in a manner that prevents the extrusions from being joggled unnecessarily out of alignment or imparting further bending or twisting thereto. The lifting mechanism 65 provided for this purpose as viewed in FIGS. 1, 2 and 4, includes a plurality of elongated bars 66 disposed at spaced intervals between the beams of walking beam storage table 44 and arranged so that the bars 66 are also parallel to but spaced between the top braces 28 of the run-out table 24.

In keeping with this aspect of the invention, provision is made to drive the bars 66 in a generally rectangular motion path whereby they move linearly under the extrusions on the run-out table 24, lift the extrusions upwardly off the top braces 32, move the extrusions linearly between the jaws of stretchers 40,42 and then lower to a position in readiness for a successive cycle.

To this end, reference is made to FIG. 4, wherein the drive mechanisms for imparting the aforementioned rectangular motions to the bars 66 is shown. The raising and lowering of the bars 66 is accomplished with eccentrics 68 that are driven by a motor 70 through roller chains or the like 72 as shown in FIG. 2. The motor 70 and chains 72 drive shafts 74 transversely extending across the storage table so that all of the bars 66 are driven in unison through the one source of power.

Referring to FIG. 6 it can be seen that the shafts 74 are coupled to cam discs 76 which drive follower housings 78 that depend from the bars 66. Thus, when the shafts 74 are rotated the bars are raised or lowered with the rise and fall of the cam discs.

In order to impart the linear movement to the bars 66 there is provided (FIG. 4) a reversible motor 80 which through chain 82 drives a sprocket 84 attached to transversely extending shaft 85. The shaft carries gear pinions 86 beneath each of the bars 66. As best shown in FIG. 6 the geared pinions 86 engage racks 88 carried on the other side of bars 66 so that upon rotation of the pinions in the clockwise or counterclockwise directions, the bars 66 are driven linearly to the right or left, respectively.

Referring to FIG. 5, it can be seen that the bars 66 with the racks 88 are carried by channel like members 90 through which the shaft 85 is journaled and the pinions 86 are confined between the members 90. Also, as shown in FIG. 4, the reversible drive motor 80 is carried by a depending frame structure 92 mounted to the channel members 90 of an end most one of the bars 66 so that the linear drive arrangement is free to move up and down with the bars driven through the raising and lowering mechanism previously described.

EXEMPLARY LOADING AND UNLOADING OPERATION

In order to more fully understand the operation of the stretcher loading and unloading operation of the bar 66, reference is made to FIGS. 7 through 11 wherein there is depicted in sequence a typical cycle of operation for simultaneously transferring extrusions from the run-out table to the stretchers and to the storage table. Thus, in FIG. 7 there is shown as a cycle start position, the situation where a plurality of extrusions 60, therebeing six in number, are resting upon the run-out table 24 as they would be after deposit from the press and cooling as previously described. A set of extrusions 60' are shown within the jaws of the stretcher 40 (only one being shown) and a bar 66 is shown in its rearward and downward position in readiness as viewed in FIG. 7 to the position where shown in phantom as 66'. For the purpose of confining the extrusions on the bars during pick up and transfer, the bars are provided with upstanding edges or dogs 96 at their ends and second upstanding edges or dogs 98 spaced from the end dogs 96 at a distance slightly greater than the width of the run-out table 24.

Referring now to FIG. 8 after the bars 66 reach the forward limit of their linear travel to a position beneath the extrusions a limit switch or the like (not shown) is triggered and the motor 80 is energized to operate the eccentrics 68. The bars then move in the upward direction and with the jaws of stretcher 40 open, the bars lift both sets of extrusions 60 and 60' so that the extrusions 60 are raised above the top surface of run-out table 24 and the extrusions 60' are raised above the lower jaws of the stretchers.

When the bars 66 have reached the limit of their upward movement, the motor 70 is de-energized and reversible motor 80 is energized to run in the opposite or counterclockwise direction driving bars 66 linearly to the left as viewed in FIG. 9 bringing the extrusions 60 within the jaws of the stretchers and extrusions 60' are brought to the position above the walking beam storage table 44 (not shown) as viewed in FIG. 10. At the end of the linear path of travel to the left as determined by a limit switch or the like the motor 80 is de-energized and motor 70 is energized so that the bars then again travel downwardly placing the extrusions 60 on the lower jaws of the stretchers and extrusions 60' are placed on the top surface of the storage table 44. Then, as viewed in FIG. 11 further downward travel of the bars to the out of way limit position below the top surface of the storage table returns them to the position which is the same as shown in FIG. 7, where they are in readiness for a subsequent cycle. A new set of extrusions 60'' are then deposited by the extrusion press onto the run-out table 24.

It will be appreciated that the walking beams 46 of the storage table are coordinated in motion with the bars 66 so that extrusions such as 60' which have been removed from the stretchers and placed on the storage table are then walked along the storage table away from the stretchers with each cycle of operation of the bars 66 that load and unload the stretchers.

The extrusion handling system in accordance with the present invention enable mass production of aluminum extrusions and the like on a fully automated basis with a minimum of plant space being required by the centering of the various operations of cooling, cutting and stretching directly about the press run-out table. In the exemplary system shown in the drawings and described in detail herein, a storage table has been included, however, it will be appreciated that where still further space saving may be desirable the storage table can be eliminated and the extrusions may be transferred directly from the stretchers on to a conveyor or the like that then shifts the extrusions away to storage, shipment or further processing locations.

In the following claims the term "run-out table" is intended to include not only a table with stationary surfaces thereon, but is also intended to refer to tables having rollers or other movable surfaces of the type that are known as run-out "conveyers."

We claim as our invention:

1. In a system for automatically handling extrusions discharged from a press onto a run-out table or the like, the method comprising the steps of
    a. rapidly cooling the extrusions on said run-out table;
    b. cutting the ends of said extrusions on said run-out table to form predetermined even lengths;
    c. directly transferring said extrusions from the run-out table into stretching means located along side said table;
    d. depositing a second set of extrusions from said press onto the run-out table while stretching said first set of extrusions; and
    e. simultaneously transferring said first set of extrusions out of the stretchers while transferring said second set of extrusions from the run-out table to the stretchers.

2. The method of claim 1 wherein said cooling step is performed by spraying liquid coolant from sprayers disposed above the run-out table and spraying completely along the length of the extrusions thereon.

3. The method of claim 1 wherein said extrusions are transferred to and from said stretchers along a substantially rectangular path of motion whereby said extrusions are moved vertically upward from the run-out table and stretchers and linearly in a horizontal direction into and out from the stretchers.

4. In an extrusion handling system including a run-out table or the like for receiving extrusions that are extruded from an extrusion press, the combination comprising:

a. cooling means associated with said run-out table for cooling said extrusions when they are received on said table;
b. saw means disposed along side said table for cutting off uneven ends of said extrusions;
c. stretcher means disposed along side said table for stretching the extrusions to straighten and work harden the same, and;
d. loading means for transporting said extrusions directly from said table to the stretcher means, said loading means moving in a substantially rectangular path of motion whereby said means move linearly under the extrusions on the run-out table, lifts the extrusions vertically upward, moves the extrusions linearly to the stretcher means and moves vertically downward to an out-of-the-way position.

5. An extrusion handling system as claimed in claim 4 wherein said loader means includes a plurality of space horizontal bars.

6. An extrusion handling system as claimed in claim 5 wherein said bars include first upstanding dogs adjacent their forward ends and second upstanding dogs spaced inwardly of said forward end dogs so that said bars pick up a first set of extrusions at the run-out table with said extrusions being between the first and second dogs and said bars pick up a second set of extrusions from the stretchers with said second set of extrusions being located rearwardly of said second dogs.

7. An extrusion handling system as claimed in claim 5 wherein said bars simultaneously transfer extrusions away from said stretchers and from said run-out table to said stretchers.

8. An extrusion handling system as claimed in claim 4 wherein said cooling means comprises,
liquid coolant spraying means disposed above said run-out table, and
said spray means being disposed so that coolant is sprayed substantially along the entire lengths of the extrusions on said run-out table.

* * * * *